United States Patent
Fripp et al.

(10) Patent No.: US 11,353,895 B2
(45) Date of Patent: Jun. 7, 2022

(54) DENSITY-BASED AUTONOMOUS FLOW CONTROL DEVICE

(71) Applicant: Halliburton Energy Services, Inc., Houston, TX (US)

(72) Inventors: Michael Linley Fripp, Carrollton, TX (US); Stephen Michael Greci, Little Elm, TX (US); Hadi Arabnejad Khanouki, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 246 days.

(21) Appl. No.: 16/507,234

(22) Filed: Jul. 10, 2019

(65) Prior Publication Data

US 2020/0064871 A1 Feb. 27, 2020

Related U.S. Application Data

(60) Provisional application No. 62/721,813, filed on Aug. 23, 2018.

(51) Int. Cl.
| | |
|---|---|
| *G05D 7/01* | (2006.01) |
| *E21B 34/08* | (2006.01) |
| *G05D 11/03* | (2006.01) |
| *E21B 43/12* | (2006.01) |
| *E21B 43/08* | (2006.01) |

(52) U.S. Cl.
CPC ............ *G05D 7/0146* (2013.01); *E21B 34/08* (2013.01); *E21B 43/12* (2013.01); *G05D 7/018* (2013.01); *G05D 11/03* (2013.01); *E21B 43/08* (2013.01)

(58) Field of Classification Search
CPC ...... E21B 34/08; E21B 43/12; F16K 99/0063; G05D 7/0146; G05D 11/03

USPC .......................................... 137/172; 422/506
See application file for complete search history.

(56) References Cited

U.S. PATENT DOCUMENTS

| | | | | |
|---|---|---|---|---|
| 4,382,597 | A | * | 5/1983 | Minami ................. A63F 7/025 273/457 |
| 9,453,395 | B2 | | 9/2016 | Fripp et al. |
| 2009/0114395 | A1 | | 5/2009 | Holmes et al. |
| 2013/0068467 | A1 | | 3/2013 | Zhou |
| 2013/0220633 | A1 | | 8/2013 | Felten |
| 2014/0041731 | A1 | | 2/2014 | Fripp et al. |
| 2015/0308226 | A1 | | 10/2015 | Killie et al. |
| 2016/0328497 | A1 | * | 11/2016 | Hamza ................ E21B 41/0035 |

(Continued)

FOREIGN PATENT DOCUMENTS

| | | |
|---|---|---|
| WO | 2010056977 | 5/2010 |
| WO | 2018093516 | 5/2018 |
| WO | 2019078821 | 4/2019 |

OTHER PUBLICATIONS

International Search Report and Written Opinion for PCT Application No. PCT/US2019/041161, dated Oct. 24, 2019.

*Primary Examiner* — Robert E Fuller
(74) *Attorney, Agent, or Firm* — Scott Richardson; C. Tumey Law Group PLLC

(57) ABSTRACT

A control system may comprise a flow control device, wherein the flow control device comprises water floats and gas floats and a regulatory valve connected to the flow control device through a control line. An autonomous flow control device may comprise a housing, one or more floats disposed within the housing, one or more protrusions connected to the outside of the housing, and an outlet disposed in the housing.

20 Claims, 3 Drawing Sheets

WATER

OIL

(56) References Cited

U.S. PATENT DOCUMENTS

2020/0018136 A1\* 1/2020 Bowen .................... E21B 34/14
2020/0308927 A1\* 10/2020 Fripp ..................... E21B 34/06

\* cited by examiner

DENSITY-BASED AUTONOMOUS FLOW CONTROL DEVICE

BACKGROUND

In hydrocarbon production wells, it may be beneficial to regulate the flow of formation fluids from a subterranean formation into a wellbore penetrating the same. A variety of reasons or purposes may necessitate such regulation including, for example, prevention of water and/or gas coning, minimizing water and/or gas production, minimizing sand production, maximizing oil production, balancing production from various subterranean zones, equalizing pressure among various subterranean zones, and/or the like.

A number of devices are available for regulating the flow of formation fluids. Some of these devices may be non-discriminating for different types of formation fluids and may simply function as a "gatekeeper" for regulating access to the interior of a wellbore pipe, such as a well string. Such gatekeeper devices may be simple on/off valves or they may be metered to regulate fluid flow over a continuum of flow rates. Other types of devices for regulating the flow of formation fluids may achieve at least some degree of discrimination between different types of formation fluids. Such devices may include, for example, tubular flow restrictors, nozzle-type flow restrictors, autonomous inflow control devices, non-autonomous inflow control devices, ports, tortuous paths, combinations thereof, and the like.

Autonomous flow control devices may be particularly advantageous in subterranean operations, since they are able to automatically regulate fluid flow without the need for operator control due to their design. In this regard, autonomous flow control devices may be designed such that they provide a greater resistance to the flow of undesired fluids (e.g., gas and/or water) than they do desired fluids (e.g., oil), particularly as the percentage of the undesired fluids increases.

While autonomous flow control devices may operate in a passive fashion, it may be desirable to limit the flow of an undesired fluid into the interior of a production tubing string. For example, oftentimes, the ratio of oil, gas, and water in a stimulated fluid may be less than optimal.

BRIEF DESCRIPTION OF THE DRAWINGS

These drawings illustrate certain aspects of some examples of the present invention and should not be used to limit or define the invention.

DETAILED DESCRIPTION

Provided are systems and methods for controlling the fluid flow into an interior of a production tubing string from the surrounding formations. As discussed below, design features may include the addition of a shuttle valve between the autonomous flow control device and the production tubing string. In examples, the shuttle valve may selectively restrict any fluid flow through the outlet flow ports of the autonomous flow control device into the production tubing string.

Figure 1:
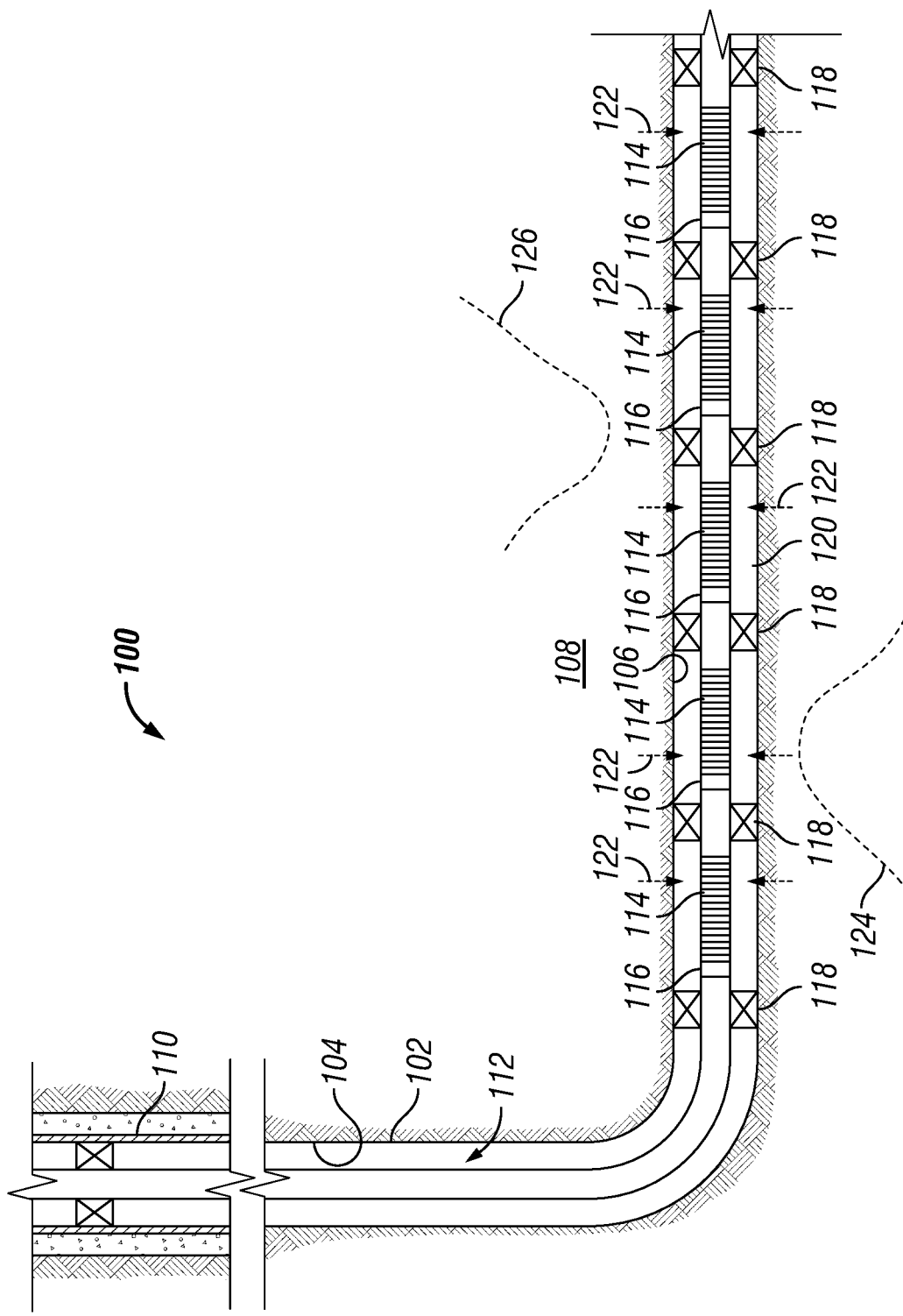
FIG. 1 illustrates an example of a well system.

FIG. 1 illustrates a well system 100 which may embody principles of the present disclosure, according to one or more examples. As illustrated, well system 100 may include a wellbore 102 that comprises a generally vertical uncased section 104 that may transition into a generally horizontal uncased section 106 extending through a subterranean formation 108. In some examples, the vertical section 104 may extend downwardly from a portion of wellbore 102 having a string of casing 110 cemented therein. A tubular string, such as production tubing 112, may be installed in or otherwise extended into wellbore 102.

As depicted, a plurality of well screens 114, flow control devices 116, and packers 118 may be interconnected along production tubing 112, such as along portions of the production tubing 112 in horizontal section 106 of wellbore 102. Packers 118 may be configured to seal off an annulus 120 defined between production tubing 112 and the walls of wellbore 102. As a result, fluids 122 may be produced from multiple intervals of the surrounding subterranean formation 108 via isolated portions of annulus 120 between adjacent pairs of packers 118.

As illustrated, in some examples, a well screen 114 and a flow control device 116 may be interconnected in production tubing 112 and positioned between a pair of packers 118. Without limitation, well screens 114 may be swell screens, wire wrap screens, mesh screens, sintered screens, expandable screens, pre-packed screens, treating screens, or other known screen types. In operation, well screen 114 may be configured to filter fluids 122 flowing into production tubing 112 from annulus 120. Flow control device 116 may be configured to restrict or otherwise regulate the flow of fluids 122 into production tubing 112, based on certain physical characteristics of the fluids. In examples, flow control device 116 may be a centrifugal fluid selector, wherein a portion of the centrifugal fluid selector may be actuated to rotate by the flow of fluids 122 and centrifugal force.

Without limitation, flow control device 116 may be an autonomous flow control device. The autonomous flow control device may utilize fluid dynamics and delay the flow of unwanted fluids such as water and/or gas into the interior of production tubing 112. The autonomous flow control device may operate as a passive flow control device, not requiring moving components and/or electronics. The autonomous flow control device may be any suitable shape. Without limitation, a suitable shape may include, but is not limited to, cross-sectional shapes that are circular, elliptical, triangular, rectangular, square, hexagonal, and/or combinations thereof. The autonomous flow control device may be made from any suitable material. Suitable materials may include, but are not limited to, metals, nonmetals, polymers, ceramics, and/or combinations thereof. Without limitation, the autonomous flow control device may be made from tungsten carbide and/or steel.

It will be appreciated that well system 100 is merely one example of a wide variety of well systems in which the principles of this disclosure may be utilized. Accordingly, it should be understood that the principles of this disclosure are not necessarily limited to any of the details of the depicted well system 100, or the various components thereof, depicted in the drawings or otherwise described herein. For example, it is not necessary in keeping with the principles of this disclosure for wellbore 102 to include a generally vertical wellbore section 104 or a generally horizontal wellbore section 106. Moreover, it is not necessary for fluids 122 to be only produced from subterranean formation 108 since, in other examples, fluids may be injected into subterranean formation 108, or fluids 122 may be both injected into and produced from subterranean formation 108, without departing from the scope of the disclosure.

Furthermore, it is not necessary that at least one well screen 114 and flow control device 116 be positioned between a pair of packers 118. Nor is it necessary for a single flow control device 116 to be used in conjunction with a single well screen 114. Rather, any number, arrangement and/or combination of such components may be used, without departing from the scope of the disclosure. In some applications, it is not necessary for flow control device 116 to be used with a corresponding well screen 114. For example, in injection operations, the injected fluid could be flowed through flow control device 116, without also flowing through well screen 114.

Those skilled in the art will readily recognize the advantages of being able to regulate the flow of fluids 122 into production tubing 112 from each zone of subterranean formation 108, for example, to prevent water coning 124 or gas coning 126 in subterranean formation 108. Other uses for flow regulation in a well may include, but are not limited to, balancing production from (or injection into) multiple zones, minimizing production or injection of undesired fluids, maximizing production or injection of desired fluids, etc.

Figure 2:
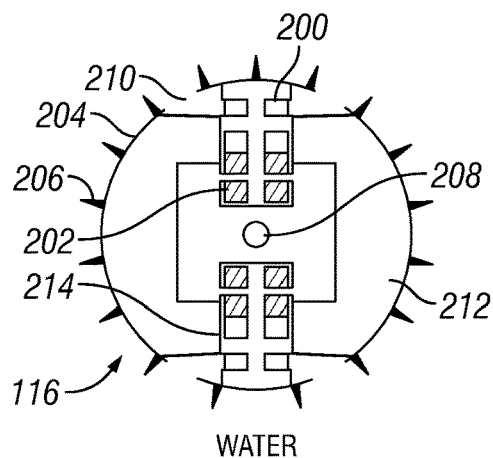
FIG. 2 illustrates a schematic view showing the position of floats as a flow control device operates in water.
Figure 3:
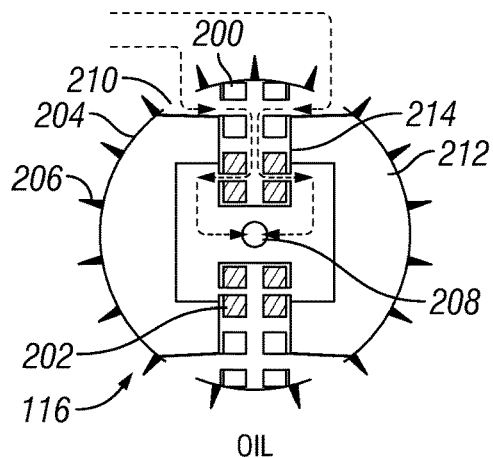
FIG. 3 illustrates a schematic view showing the position of floats as a flow control device operates in oil.
Figure 4:
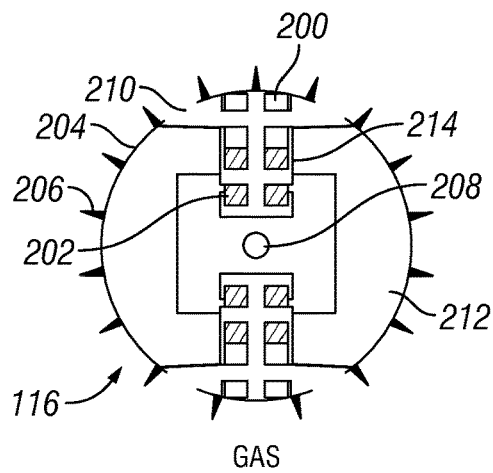
FIG. 4 illustrates a schematic view showing the position of floats as a flow control device operates in gas.
Figure 5:
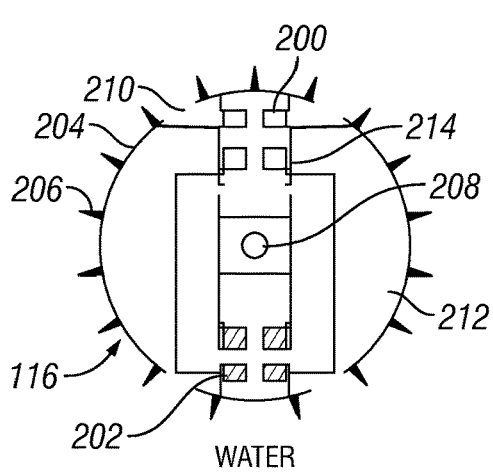
FIG. 5 illustrates a schematic view showing the position of floats as a flow control device operates in water.
Figure 6:
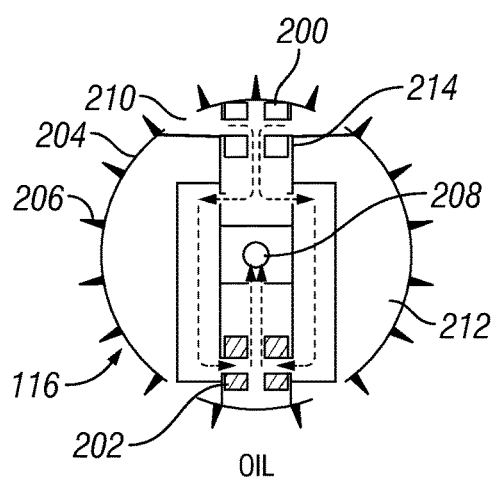
FIG. 6 illustrates a schematic view showing the position of floats as a flow control device operates in oil.
Figure 7:
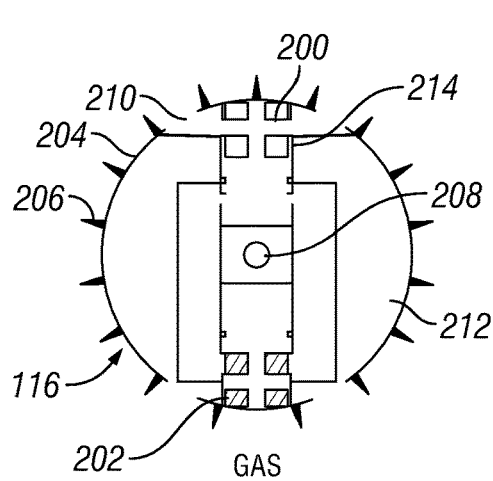
FIG. 7 illustrates a schematic view showing the position of floats as a flow control device operates in gas.

FIGS. 2-7 illustrate different views of flow control device 116. Collectively, FIGS. 2-4 depict flow control device 116 with a first flow path while FIGS. 5-7 depict flow control device 116 with a second flow path. FIGS. 2 and 5 depict a schematic view showing the positions of water floats 200 and gas floats 202 as flow control device 116 operates in fluids 122 (i.e., referring to FIG. 1) comprising mostly of water. FIGS. 3 and 6 depict a schematic view showing the positions of water floats 200 and gas floats 202 as flow control device 116 operates in fluids 122 comprising mostly of oil. FIGS. 4 and 7 depict a schematic view showing the positions of water floats 200 and gas floats 202 as flow control device 116 operates in a gas. Flow control device 116 may be designed to regulate the flow of fluids 122 into production tubing 112 (i.e., referring to FIG. 1). Flow control device 116 may comprise a housing 204, protrusions 206, an outlet 208, water floats 200, and gas floats 202.

In examples, housing 204 may be any suitable size, height, and/or shape. Without limitation, a suitable shape may include, but is not limited to, cross-sectional shapes that are circular, elliptical, triangular, rectangular, square, hexagonal, and/or combinations thereof. In certain examples, housing 204 may be circular. Housing 204 may encase the internal components of flow control device 116. In examples, housing 204 may protect the internal components of flow control device 116 from an external environment. In certain examples, housing 204 may comprise protrusions 206.

Protrusions 206 may be extensions of material from the diameter of housing 204. In examples, protrusions 206 may be any suitable size, height, and/or shape. Without limitation, a suitable shape may include, but is not limited to, cross-sectional shapes that are circular, elliptical, triangular, rectangular, square, hexagonal, and/or combinations thereof. In certain examples, protrusions 206 may visually appear and physically operate similarly to teeth on a mechanical gear.

In alternate examples, protrusions 206 may be extensions of material from a ring of material that is coupled to housing 204. In these examples, the inner diameter of the ring of material may be equal to or larger than the diameter of housing 204. Depending on the inner diameter of the ring of material, there may or may not be an annulus between the ring of material and housing 204. During operations of flow control device 116, a portion of flow control device 116 may be disposed within a flow path of fluids 122 (i.e., referring to FIG. 1). In examples, the flow of fluids 122 may interact with protrusions 206. As the pressure of fluids 122 increases at a contact point between fluids 122 and protrusions 206, protrusions 206 may be actuated to rotate. In certain examples, housing 204 may rotate along with protrusions 206. In alternate examples, housing 204 may remain stationary as protrusions 206 rotate around housing 204.

In examples, there may be an opening 210 between protrusions 206 that allows access to an internal chamber 212 of housing 204. There may be a plurality of openings 210 that allow fluids 122 to flow from the flow path, between a set of protrusions 206, and into internal chamber 212. In examples, internal chamber 212 may be any suitable size, height, and/or shape. Without limitation, a suitable shape may include, but is not limited to, cross-sectional shapes that are circular, elliptical, triangular, rectangular, square, hexagonal, and/or combinations thereof. Internal chamber 212 may comprise various structures and/or supports that guide the flow of fluids 122 towards outlet 208.

In examples, outlet 208 may be disposed within internal chamber 212 of housing 204. Outlet 208 may be an opening that allows fluids 122 to exit flow control device 116. Outlet 208 may be coupled to a control line (discussed further below), wherein fluids 122 may flow through the control line and engage a shuttle valve (discussed further below). In examples, fluids 122 that flowed through the control line may enter into the interior of production tubing 112 (i.e., referring to FIG. 1) from the shuttle valve. Without limitation, the control line may be identified as tubing. Alternatively, the shuttle valve may prevent the flow of fluids 122 into the interior of production tubing 112. Without limitations, fluids 122 may be able to flow through outlet 208 depending on the configuration of water floats 200 and gas floats 202.

Water floats 200 and gas floats 202 may block a potential flow path of fluids 122 while in an initial position. Water floats 200 and gas floats 202 may be structures designed to float when disposed in a particular fluid due to having a lower density than said fluid. Without limitations, water floats 200 may have a specific gravity of about 0.8 to about 1.0. Without limitations, gas floats 202 may have a specific gravity of about 0.2 to about 0.7. In examples, water floats 200 and gas floats 202 may float while disposed in fluids 122 (i.e., referring to FIG. 1) comprising mostly of water. In other examples, water floats 200 may sink and gas floats 202 may float while disposed in fluids 122 comprising mostly of oil. In further examples, water floats 200 and gas floats 202 may sink while disposed in a gas. Water floats 200 and gas floats 202 may be made from any suitable material. Suitable materials may include, but are not limited to, metals, non-metals, polymers, ceramics, and/or combinations thereof. Without limitations, water floats 200 may be made from any material that is less dense than water and/or denser than oil.

In examples, water floats 200 may be any suitable size, height, and/or shape. Without limitation, a suitable shape may include, but is not limited to, cross-sectional shapes that are circular, elliptical, triangular, rectangular, square, hexagonal, and/or combinations thereof. With reference to FIGS. 2-7, water floats 200 and gas floats 202 may have a square cross-sectional shape.

With reference to FIGS. 2-7, water floats 200 and gas floats 202 may be disposed between a set of walls 214 so as to constrain the path of motion of water floats 200 and gas floats 202 to be one-dimensional. In these examples, water floats 200 and gas floats 202 may slide along the set of walls 214 until inhibited by an obstruction. Water floats 200 and gas floats 202 may block a potential flow path for fluids 122 (i.e., referring to FIG. 1) to travel through in order to reach outlet 208. As flow control device 116 rotates, the angular velocity of flow control device 116 may cause water floats 200 and gas floats 202 to displace outwards. Depending on the density of fluids 122, this may allow access to the potential flow path that leads to outlet 208. As fluids 122 enter internal chamber 212 through opening 210, fluids 122 may travel through the potential flow path and out of flow control device 116 through outlet 208. If fluids 122 comprise a large concentration of water, the buoyant force of the water may counteract the centrifugal force of the rotation of flow control device 116. Water floats 200 and gas floats 202 may displace towards an inner position, thereby blocking the potential flow path to outlet 208. If fluids 122 comprise a large concentration of oil, the buoyant force of the oil may counteract the centrifugal force of the rotation of flow control device 116 acting on gas floats 202. In these examples, gas floats 202 may displace towards an inner position while water floats 200 may remain disposed about an outer location, thereby blocking the potential flow path to outlet 208. The displacement of gas floats 202 may provide access to a portion of the potential flow path, but as water floats 200 are denser than oil, water floats 200 may block a separate portion of the potential flow path. If fluids 122 is a gas, there may not be a buoyant force to counteract the centrifugal force of the rotation of flow control device 116 for either water floats 200 or gas floats 202. Both water floats 200 and gas floats 202 may remain displaced outwards, thereby blocking the potential flow path to outlet 208.

Figure 8:
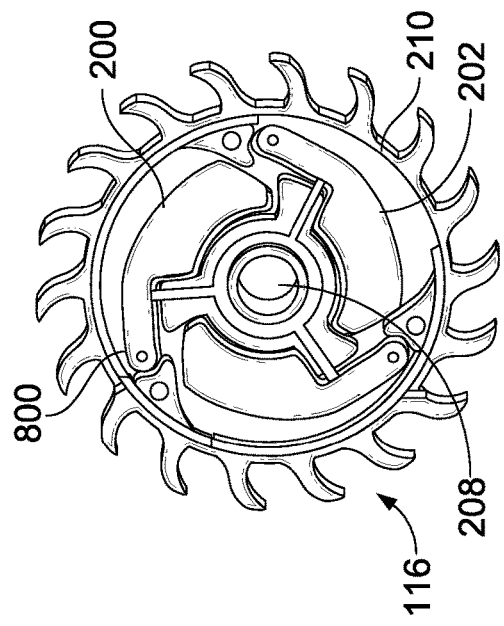
FIG. 8 illustrates an example flow control device with hinged floats.

FIG. 8 illustrates an example flow control device 116 with a different arrangement of water floats 200 and/or gas floats 202. In examples, as best seen on FIG. 8, water floats 200 and/or gas floats 202 may be a customized shape and rotate about a hinge 800. As fluids 122 (i.e., referring to FIG. 1) enter flow control device 116 through opening 210, fluids 122 may push against water floats 200 and/or gas floats 202 causing water floats 200 and/or gas floats 202 to rise. As water floats 200 and/or gas floats 202 rise due to a density difference, water floats 200 and/or gas floats 202 may rotate about hinge 800. With continued reference to FIG. 8, as water floats 200 and/or gas floats 202 displace due to the introduction of fluids 122, a potential flow path that leads to outlet 208 may become available to fluids 122.

Figure 9:
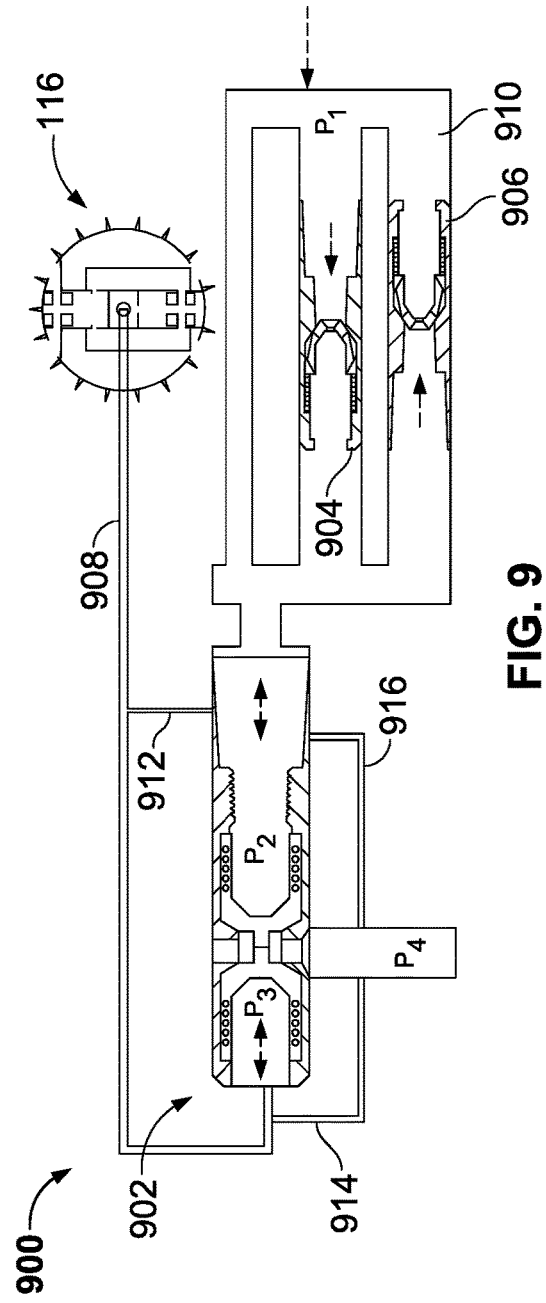
FIG. 9 illustrates a diagram of the fluid flow of fluids from a subterranean formation to the interior of a production tubing

FIG. 9 illustrates a diagram of the fluid flow of fluids 122 (i.e., referring to FIG. 1) from subterranean formation 108 to the interior of production tubing 112 (i.e., referring to FIG. 1). In examples, there may be a control system 900 disposed on production tubing 112. Control system 900 may control the flow of fluids 122 into and/or out of the interior of production tubing 112. Without limitations, control system 900 may comprise a regulatory valve 902, a bypass check valve 904, an injection valve 906, and a control line 908.

In examples, a portion of flow control device 116 may be disposed within the flow of fluids 122. The flow of fluids 122 may be in a feedback loop 910. In examples, bypass check valve 904 and injection valve 906 may be disposed within feedback loop 910. Without limitations, bypass check valve 904 and injection valve 906 may be the same or similar valve in that both bypass check valve 904 and injection valve 906 allow fluids 122 to flow in one direction. The flow of fluids 122 from subterranean formation 108 may travel through the flow control device 116 and the bypass check valve 904. However, the flow of fluids 122 from subterranean formation 108 may be inhibited by injection valve 906. The various pressures in the control system 900 are depicted as $P_1$, $P_2$, $P_3$, and $P_4$.

The flow of fluids 122 may cause flow control device 116 to rotate. In examples, fluids 122 may enter into flow control device 116. If fluids 122 mostly comprises of oil, then fluids 122 may exit flow control device 116 and flow through control line 908. Control line 908 may be coupled to regulatory valve 902.

Without limitations, regulatory valve 902 may be a shuttle valve, a ball valve, a diaphragm shuttle valve, a bellows valve, a pilot-operated valve, a pilot-operated check valve, and/or the like. In examples, regulatory valve 902 may comprise a biasing spring. In certain examples, regulatory valve 902 may be an inverse shuttle valve. If regulatory valve 902 is a type of shuttle valve, the shuttle may be a ball shuttle. In examples, the pressure supplied from control line 908 may be greater than a secondary pressure within regulatory valve 902. The pressure supplied from control line 908 may be equal to the pressure of fluids 122 that are flowing from subterranean formation 108. If the pressure supplied from control line 908 is greater than the secondary pressure, then regulatory valve 902 may actuate to allow fluids 122 to enter into the interior of production tubing 112 (i.e., referring to FIG. 1). In certain examples, there may be a restrictor within control system 900 to ensure that the secondary pressure is less than the pressure supplied from the control line 908. In alternate examples, there may be a pressure intensifier within control system 900 to ensure that the pressure supplied from the control line 908 is greater than the secondary pressure.

If fluids 122 mostly comprises of water and/or gas, then there may be little flow of fluids 122 through control line 908. In this example, a balance line 912 may equalize the secondary pressure in regulatory valve 902 with the pressure from control line 908. There may be a weep line 914 that adjusts the pressure supplied by control line 908 to be less than the secondary pressure within regulatory valve 902. In examples, weep line 914 may be a connecting line from control line 908 to the interior of production tubing 112. If the pressure supplied by control line 908 is less than the secondary pressure within regulatory valve 902, then regulatory valve 902 may be actuated to close and restrict the flow of fluids 122 into the interior of production tubing 112.

In certain examples, a complete seal may not be needed when restricting regulatory valve 902. A complete seal may prevent flow control device 116 from rotating. Therefore, there may be a flow line 916 that connects the interior of production tubing 112 to the secondary pressure within regulatory valve 902. In examples, flow line 916 may be a leak around the valve seat or a bypass around the valve seat within regulatory valve 902. Flow line 916 may allow the circulation of the flow of fluids 122 supplied by subterranean formation 108 to continue, thus ensuring the rotation of flow control device 116.

The preceding description provides various examples of the systems and methods of use disclosed herein for controlling the flow of fluid from a formation to production tubing which may contain different method steps and alternative combinations of components.

Statement 1. A control system may comprise a flow control device, wherein the flow control device comprises water floats and gas floats, and a regulatory valve connected to the flow control device through a control line.

Statement 2. The control system of statement 1, further comprising a bypass check valve and an injection valve.

Statement 3. The control system of statements 1 or 2, wherein the flow control device may further comprise a housing, wherein the water floats and the gas floats are disposed within the housing, one or more protrusion connected to the outside of the housing, and an outlet disposed in the housing.

Statement 4. The control system of statement 3, wherein the housing includes an internal chamber and the water floats and the gas floats are disposed in the internal chamber.

Statement 5. The control system of statement 1, further comprising a balance line, a weep line, and a flow line to balance a pressure differential between one or more fluids from a subterranean formation and an interior of a production string.

Statement 6. The control system of statements 1, 2, or 5, wherein the water floats have a specific gravity of about 0.8 to about 1.0, and wherein the gas floats have a specific gravity of about 0.2 to about 0.7.

Statement 7. The control system of statements 1, 2, 5, or 6, wherein the flow control device is configured to rotate by centrifugal force.

Statement 8. The control system of statements 1, 2, or 5-7, wherein the regulatory valve is a shuttle valve, a ball valve, a diaphragm shuttle valve, a bellows valve, a pilot-operated valve, or a pilot-operated check valve.

Statement 9. The control system of statement 8, wherein the regulatory valve further comprises a biasing spring.

Statement 10. The control system of statements 1, 2, or 5-8, wherein the control line is configured to apply a pressure greater than a secondary pressure of the regulatory valve.

Statement 11. An autonomous flow control device may comprise a housing, one or more floats disposed within the housing, one or more protrusions connected to the outside of the housing, and an outlet disposed in the housing.

Statement 12. The autonomous flow control device of statement 11, wherein the one or more floats are water floats.

Statement 13. The autonomous flow control device of statement 12, wherein the water floats have a specific gravity of about 0.8 to about 1.0.

Statement 14. The autonomous flow control device of statements 11 or 12, wherein the one or more floats are gas floats.

Statement 15. The autonomous flow control device of statement 14, wherein the gas floats have a specific gravity of about 0.2 to about 0.7.

Statement 16. The autonomous flow control device of statements 11, 12, or 14, wherein the housing is configured to rotate by centrifugal force.

Statement 17. The autonomous flow control device of statements 11, 12, 14, or 16, wherein the one or more floats are gas floats and water floats.

Statement 18. The autonomous flow control device of statements 11, 12, 14, 16, or 17, wherein the housing further comprises an internal chamber.

Statement 19. The autonomous flow control device of statement 18, wherein the internal chamber is configured to move a fluid from to the outlet.

Statement 20. The autonomous flow control device of statements 11, 12, 14, or 16-18, wherein the one or more protrusions are configured to rotate the housing from force exerted upon the one or more protrusions by a fluid.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A control system comprising:
   a flow control device, wherein the flow control device comprises at least one water float and at least one gas float, the flow control device operable to rotate due to protrusions of the flow control device; and wherein the at least one water float is disposed between a first set of walls and wherein the at least one gas float is disposed between a second set of walls.

2. The control system of claim 1, further comprising a flow path that extends from the first set of walls to the second set of walls.

3. The control system of claim 1, wherein the flow control device further comprises: a housing, wherein the water floats and the gas floats are disposed within the housing.

4. The control system of claim 3, wherein the housing includes an internal chamber and the water floats and the gas floats are disposed in the internal chamber.

5. The control system of claim 3, wherein one or more of the protrusions are connected to the outside of the housing, each protrusion operable to receive fluid to rotate the control system.

6. The control system of claim 5, further comprising an opening disposed between two of the protrusions.

7. The control system of claim 1, wherein the water floats have a specific gravity of about 0.8 to about 1.0, and wherein the gas floats have a specific gravity of about 0.2 to about 0.7.

8. The control system of claim 1, further comprising an outlet disposed between the first set of walls and the second set of walls.

9. The control system of claim 8, further comprising a fluid path that extends from the first set of walls to the outlet.

10. The control system of claim 8, further comprising a fluid path that extends from the second set of walls to the outlet.

11. A control system comprising:
a housing comprising a chamber;
a first float and a second float disposed within the chamber, wherein the first float is disposed between a first set of walls, and wherein the second float is disposed between a second set of walls, the control system operable to rotate due to protrusions of the control system, to control a flow of formation fluid through the chamber, wherein the control system is disposed in a wellbore; and
openings disposed along an exterior surface of the housing.

12. The control system of claim 11, wherein the floats comprise water floats, gas floats, or combinations thereof.

13. The control system of claim 11, wherein the housing comprises the protrusions extending outward from the exterior surface of the housing, each protrusion operable to receive fluid to rotate the control system.

14. The control system of claim 13, wherein the openings are disposed between the protrusions.

15. The control system of claim 11, further comprising an outlet disposed between the first set of walls and the second set of walls.

16. A control system comprising:
a housing comprising protrusions and an internal chamber; and
a first float and a second float disposed within the internal chamber, wherein each float comprises at least one gas float or at least one water float, wherein the first float is disposed between a first set of walls, and wherein the second float is disposed between a second set of walls, the control system operable to rotate due to the protrusions, to control a flow of formation fluid through the internal chamber, wherein the control system is disposed in a wellbore.

17. The control system of claim 16, further comprising openings disposed between the protrusions.

18. The control system of claim 17, wherein the first float is disposed opposite to the second float within the housing.

19. The control system of claim 18, further comprising an outlet disposed between the first and second floats.

20. The control system of claim 19, further comprising a fluid path extending from the first set of walls to the outlet.

* * * * *